United States Patent
Honda et al.

(10) Patent No.: US 6,211,283 B1
(45) Date of Patent: Apr. 3, 2001

(54) ELECTRICALLY INSULATED METALLIC SURFACES WITH INTERIOR CORNERS AND METHODS AND COMPOSITIONS THEREFOR

(75) Inventors: Takumi Honda, Kanagawa-Ken; Kenji Takahashi, Tochigi-ken, both of (JP)

(73) Assignee: Henkel Corporation, Plymouth Meeting, PA (US)

( * ) Notice: Subject to any disclaimer, the term of this patent is extended or adjusted under 35 U.S.C. 154(b) by 0 days.

(21) Appl. No.: 09/125,847

(22) PCT Filed: Feb. 21, 1997

(86) PCT No.: PCT/US97/02667

§ 371 Date: Aug. 21, 1998

§ 102(e) Date: Aug. 21, 1998

(87) PCT Pub. No.: WO97/30794

PCT Pub. Date: Aug. 28, 1997

(30) Foreign Application Priority Data

Feb. 21, 1996 (JP) .................................................. 8-058419

(51) Int. Cl.$^7$ ....................................................... C08J 3/00
(52) U.S. Cl. .............................................................. 524/501
(58) Field of Search ............................................... 524/501

(56) References Cited

U.S. PATENT DOCUMENTS

| | | | |
|---|---|---|---|
| 3,709,743 | * 1/1973 | Dalton | 148/6.2 |
| 4,357,372 | * 11/1982 | Leister | 427/345 |
| 4,389,328 | * 6/1983 | Bellettiere | 252/194 |
| 4,527,992 | * 7/1985 | Friese | 8/94.21 |
| 5,252,363 | * 10/1993 | Anderson | 427/386 |
| 5,352,726 | 10/1994 | Hall | 524/435 |
| 5,663,601 | 9/1997 | Wakabayashi et al. | 310/45 |
| 5,688,560 | * 11/1997 | Honda | 427/341 |
| 5,760,112 | * 6/1998 | Hirota | 524/157 |

* cited by examiner

*Primary Examiner*—Paul R. Michl
(74) *Attorney, Agent, or Firm*—Roylance, Abrams, Berdo & Goodman, L.L.P.

(57) ABSTRACT

An effective electrically insulating film on the surface of a metal object, such as a common type of electric motor core assembly, in which the surface includes an interior corner on which insulation is desired, can be formed by autodeposition with an adequate thickness in the interior corner without need for excessive thickness on other parts of the surface that are more readily covered by prior art methods of applying an insulating coating. If the autodeposition composition used includes as its primary film-forming component a copolymer of certain acrylic monomers, a very high volume resistivity can be achieved.

4 Claims, 1 Drawing Sheet

ELECTRICALLY INSULATED METALLIC SURFACES WITH INTERIOR CORNERS AND METHODS AND COMPOSITIONS THEREFOR

FIELD OF THE INVENTION

This invention relates to (i) methods for coating, with electrically insulating films, metallic surfaces with interior corners, (ii) articles of manufacture so produced, and particularly (iii) electric motors containing them. More particularly, this invention relates to methods that can form an insulating film with excellent electrical insulating properties on the surface of a sheet-steel-laminated motor core by bringing the surface of such a motor core into contact with an autodepositing waterborne coating composition.

DESCRIPTION OF RELATED ART

Many motor cores used, for example, in small motors, require electrical insulation between electrically conductive core elements and distinct electrically conductive windings in close proximity to the core elements. The insulation has generally been provided by an insulating treatment of the core elements.

This insulating treatment has heretofore consisted of forming an insulating layer on the motor core surface using electrodeposition coatings, solvent-based sprays, powder paints, and the like. However, insulating layers applied using the aforesaid paints have a pronounced tendency to debond at the corners of the motor core, and the occurrence of this debonding causes these insulating layers to suffer from a diminished insulating performance. This has required that the insulating layer be thick.

Recent requirements on motors have been for smaller size, thinner configurations, higher performance (higher withstand voltages), and thinner insulation.

Japanese Patent Application Laid Open [Kokai or Unexamined] Number Hei 5-300681 [300,681/1993] discloses a technology for reducing the thickness of the insulation. This reference teaches the formation of insulation with excellent insulating properties and an excellent corner-coating capacity. The insulation described therein comprises two layers with a total thickness of 50 to 80 micrometres and is formed by coating the motor core surface with an epoxy resin functioning as primer and then with a ceramic paint functioning as top coat. This reference states simply that the insulating layer should consist of multiple layers; it is not limited to two layers and may consist of a larger number, such as three or four layers. This technology requires at least two coating operations to form the insulating layer and thus suffers from the drawback of poor productivity.

PROBLEMS TO BE SOLVED BY THE INVENTION

A major object of the present invention is to provide a method for coating the surface of laminated motor cores, or other surfaces with interior corners, with an electrical insulating film wherein said method can shorten the insulating treatment operation, can provide a thinner electrical insulating layer than heretofore available, and/or can provide a surface that has a coating with excellent electrical insulating properties, in particular, a high-quality electrical insulating layer in the corners of the surface.

SUMMARY OF THE INVENTION

It has been found that the desired thinner, high-quality insulating film can be generated in a shorter insulating treatment operation by contacting a surface, especially that of a laminated motor core, with an autodepositing waterborne coating composition comprising a coating-forming resin emulsion, acid, oxidizing agent, metal ion, and water, and by thereafter drying by heating.

In specific terms, the present invention provides a method for coating a surface with at least one interior corner, preferably a corner formed by an intersection between a substantially planar surface and a convex arcuate surface, so that the corner includes a deeper recess than would be formed by intersection between two mutually perpendicular substantially planar surfaces, with an electrical insulating film, characterized by forming an electrical insulating film on the surface by steps of:

(I) depositing an uncured resin film on said surface by bringing the surface into contact with an autodepositing waterborne coating composition comprising, or more preferably consisting essentially of, a coating-forming resin emulsion, acid, oxidizing agent, metal ions, and water; and then (II) drying the said uncured resin film, while it remains in place on the surface, by heating.

The present invention also provides an alternative method for coating such a surface with an electrical insulating film, characterized by forming an electrical insulating film on the surface by steps of (I) depositing an uncured resin film on said surface by bringing the surface into contact with an autodepositing waterborne coating composition comprising, or more preferably consisting essentially of, a coating-forming resin emulsion, acid, oxidizing agent, metal ions, and water;

(II) contacting said uncured resin film with an aqueous chromium-containing solution; and then (III) drying said uncured resin film, while it remains in place on the surface, by heating.

Other embodiments of the invention include liquid autodeposition coating compositions especially adapted for use in a process according to the invention and articles of manufacture including a surface coated by a process according to the invention.

Figure 1:
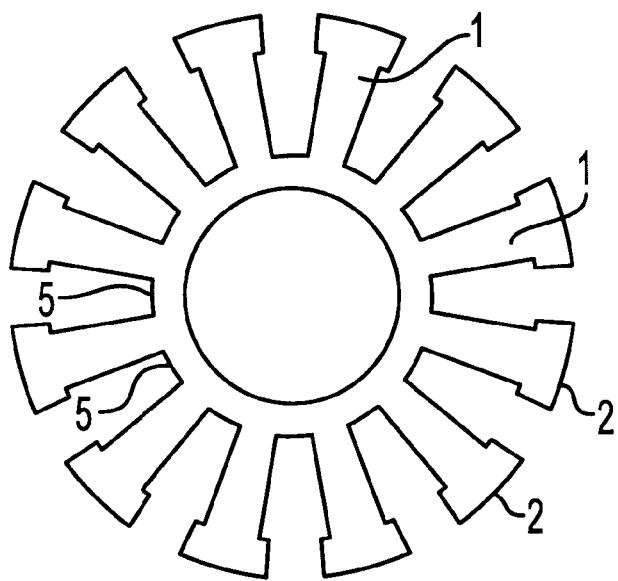
FIG. 1 is a top view of a typical shape formed from metal sheeting for use in making a motor core. Several such substantially identical shapes are laminated together in a pressing operation to form part of the desired core, which, in a top view, has the same shape as the single sheets from which it is formed. The core has a plural number of projecting poles 1, and the distal ends 2 of projecting poles 1 have convex circularly arcuate surfaces. When several such shaped sheets have been laminated together, each projecting pole has four substantially planar surfaces: a top (the only one visible in FIG. 1), a bottom, and two sides. The core also has interior convex circularly arcuate surfaces 5 between the projecting poles 1

Therefore, insulation 4 is required between the core and the windings and is generally provided by a treatment of the laminated core before the windings are applied.

DETAILED DESCRIPTION INCLUDING PREFERRED EMBODIMENTS

The invention will be described below primarily with reference to motor cores of the type noted above. However, the invention is useful, *mutatis mutandis*, for other applications in which thin insulating layers on metal substrate surfaces that include inner corners, particularly such corners as are formed by intersections between substantially planar and convex arcuate surfaces, are needed.

The invention is applied to motor cores fabricated by laminating a plural number of metal sheets. While the metal used for this purpose is not critical, sheet steel is ordinarily used. The method for laminating the sheet steel is also not critical and techniques such as press operations and the like may be used.

The autodepositing waterborne coating composition used in the present invention contains a coating-forming resin emulsion, acid, oxidizing agent, metal ions, and water, and may also contain optional components.

The resin in the coating-forming resin emulsion used by the present inventions is exemplified by acrylic resins, vinyl chloride resins, vinylidene chloride resins, urethane resins, epoxy resins, and polyester resins. The resin used by the present invention may also be a mixture of any combination of the aforementioned resins.

Acrylic resins are particularly preferred and are exemplified by the homopolymers and copolymers prepared from (meth)acrylate ester monomers, (meth)-acrylic acid-type monomers, styrene, ethylene, and the like. The copolymers consist of two or more selections from such monomers. The (meth)acrylate ester monomers are exemplified by methyl acrylate, ethyl acrylate, n-butyl acrylate, 2-hydroxyethyl acrylate, 2-hydroxypropyl acrylate, 2-ethylhexyl acrylate, methyl methacrylate, ethyl methacrylate, n-butyl methacrylate, 2-hydroxyethyl methacrylate, 2-hydroxypropyl methacrylate, glycidyl acrylate, glycidyl methacrylate, etc. The (meth)acrylic acid-type monomers are exemplified by acrylamide, methacrylamide, acrylonitrile, acrylic acid, and methacrylic acid.

Polymers of a mixture of monomers including at least one selection from each of the following groups are preferred over other types of acrylic polymers:
(A) acrylic and methacrylic acids;
(B) esters of acrylic and methacrylic acids with alcohols containing from 1 to 4 carbon atoms per alcohol molecule; and
(C) acrylonitrile, methacrylonitrile, acrylamide, and methacrylamide. Preferably, the mixture of monomers also includes:
(D) "internal surfactant" type molecules as described in U.S. Pat. No. 5,352,726 of Oct. 4, 1994 to Hall from column 7 line 59 through column 9 line 28, which portion of said patent is hereby incorporated herein by reference, except to any extent that it may be inconsistent with any explicit statement herein.

The ratio by weight in a preferred acrylic copolymer resin of residues from components (A) through (C) as defined above preferably is, with increasing preference in the order given, 1.0:{10–80}:{3–50}, 1.0:{15–65}:{6–40}, 1.0:{24–50}:{8–25}, or 1.0:{30–38}:{12–18} for the ratio (A):(B):(C). Independently, when component (D) is used, its amount preferably is, with increasing preference in the order given, 0.2–5.0, 0.4–2.5, 0.6–1.8, or 0.8–1.2% by weight of the total of all the other monomers used in the monomer mixture.

Still more preferably, component (B) of monomers as defined above preferably includes at least one selection from each of the following subcomponents:
(B.1) esters of methacrylic acid with alcohols having 1, 2, or 3, most preferably 1, carbon atoms per molecule of alcohol; and
(B.2) esters of acrylic acid.
When both subcomponents (B.1) and (B.2) are present, the ratio by weight of (B.2) to (B.1) preferably is, with increasing preference in the order given, {0.7–2.5}:1.0, {1.0–1.8}:1.0, or {1.3–1.5}:1.0. Yet more preferably, sub-component (B.2) includes at least one selection from each of the following sub-subcomponents:
(B.2.1) esters of acrylic acid with ethyl and/or methyl alcohol; and
(B.2.2) esters of acrylic acid with propyl and/or butyl alcohol.
When both sub-subcomponents (B.2.1) and (B.2.2) are present, the ratio of (B.2.1):(B.2.2) preferably is, with increasing preference in the order given, 1.0:{0.3–3.0}, 1.0:{0.5–2.0}, 1.0:{0.7–1.5}, or 1.0:{0.85 –1.15}.

The molecular weight of the acrylic resin is not normally critical. Preferably, however, the acrylic resin has a molecular weight of 50,000 to 1,000,000, or preferably 100,000 to 1,000,000, as determined by gel permeation chromatography in tetrahydrofuran, using polystyrene or polyacrylate ester standards.

The coating-forming resin emulsion used by the present invention will typically be a resin emulsion as directly afforded by the usual emulsion polymerization methods. Also usable, however, are the resin emulsions afforded by the emulsification and dispersion in water of resin already prepared by various polymerization methods.

In the case of resin emulsions prepared by emulsion polymerization, the polymerization conditions are not normally critically different from the usual procedures known in the art, which therefore are preferably employed. One example of the preparation of a coating-forming resin emulsion comprises running a polymerization reaction in a mixture of at least water, anionic and/or nonionic surfactant, polymerization initiator, and monomer (resin component) as described above.

The acid used in the present invention can be, for example, at least one selection from fluozirconic acid, fluotitanic acid, fluosilicic acid, fluoboric acid, phosphoric acid, nitric acid, and the like, but hydrofluoric acid is preferred.

The oxidizing agent used in the present invention is exemplified by hydrogen peroxide, potassium permanganate, sodium nitrite, and the like; hydrogen peroxide is preferred.

The source compound for supplying the metal ions used by the present invention is not normally critical, but this compound must be stable in the subject coating composition. Examples of the source compound are ferric fluoride, ferric nitrate, ferrous phosphate, cobaltous nitrate, and the like; ferric fluoride is preferred.

The resin content in the autodepositing waterborne coating composition used by the present invention is preferably from 5 to 550 grams per liter (hereinafter usually abbreviated as "g/L") and more preferably from 30 to 100 g/L, in each case measured as the resin solids concentration.

Also, independently for each concentration noted, in an autodepositing waterborne coating composition used by the present invention: The acid concentration is preferably from 0.1 to 5.0 g/L and more preferably from 0.5 to 3.0 g/L; the oxidizing agent concentration is preferably from 0.01 to 3.0 g/L and the concentration of the metal ion source compound is preferably from 0.1 to 50, more preferably from 0.5 to 20, still more preferably from 1.0 to 10, and yet more preferably from 1.5 to 4, g/L.

As an optional component, the autodepositing waterborne coating composition used in the present invention may also contain a film-forming aid for the purpose of reducing the minimum film-forming temperature and facilitating fusion and adhesion of the deposited resin particles. This film-forming aid is exemplified by trialkylpentanediol isobutyrate, the alkyl Carbitols™, and the like. Pigment is another optional component that may be present in the composition, for example, carbon black, phthalocyanine blue, phthalocyanine green, quinacridone red, Hansa yellow, benzidine yellow, and the like.

Dipping, spraying, etc., preferably dipping, can be employed to bring the autodepositing waterborne coating composition used in the present invention into contact with the surface of the laminated motor core. Neither the treatment temperature nor the treatment time are particularly critical, but suitable conditions for dipping are dipping for 30 to 300 seconds and preferably for 60 to 180 seconds in the composition maintained at ambient temperature, for example, 18° C. to 25° C. Any surfaces not desired to be coated, such as the distal end surfaces 2 shown in FIG. 1, may be protected with wax, tape, plastic film, or some similar temporary protective coating as generally known in the autodeposition art.

The resin film add-on by the coating composition to the surface of the laminated motor core is not always critical, but post-drying film thicknesses of 10 to 40 micrometres are usually preferred.

In addition, the motor core surface is ordinarily cleaned by degreasing and water rinsing before application of the coating composition. Resin deposition on the motor core surface is generally followed by a water rinse. This water rinse can be carried out by placing the core in a water flow, but is ordinarily run by dipping in water at ambient temperature for 10 to 120 seconds.

The thermal drying step is not specifically restricted, but suitable conditions are 5 to 60 minutes and preferably 10 to 20 minutes in a forced convection oven at an atmosphere temperature of 80° C. to 180° C.

The usual hexavalent chromium compounds, such as dichromic acid, ammonium dichromate, and the like, are examples of the chromium employed in the chromium-containing aqueous solution optionally used by the present invention. The chromium concentration in this aqueous chromium solution is preferably from 0.1 to 20 g/L as hexavalent chromium. The additional presence of trivalent chromium in this aqueous chromium solution is unproblematic in terms of solution performance. Suitable conditions for contacting the uncured resin film with the chromium-containing aqueous solution are dipping for 30 to 180 seconds in the solution at ambient or elevated temperature. After this treatment the uncured resin film—without a water rinse—is dried by heating using the above-described conditions to give the electrical insulating film. Film formation according to the method of the present invention may optionally be followed by coating with a powder paint or a conventional paint.

During the formation of the uncured resin film on the sheet steel laminate, the coating method according to the present invention is able to form an almost entirely uniform film in those regions where the subject autodepositing coating composition comes into contact with the sheet steel surface. The present coating method is able to do this because it achieves film formation through the chemical activity of the autodepositing coating composition over the metal work-piece surface (the metal ions eluted from the metal surface by etching act on the resin particles in the coating composition to cause their deposition onto the metal surface) without the use of an external electrical source as in electrodeposition. In addition, the character of the corner coating of the sheet steel surface remains excellent even after thermal drying of the uncured resin film, which results in the formation of an insulating film with excellent insulating properties. In particular, the composition is preferably selected so that the dried resin film in a thickness of 15 micrometres has a volume resistivity that is at least, with increasing preference in the order given, $30 \times 10^{15}$, $5.0 \times 10^{15}$, $7.0 \times 10^{15}$, $9.0 \times 10^{15}$, or $10.0 \times 10^{15}$ ohm centimeters.

A coating composition and process using it according to this invention are preferably selected so that the thickness of the dried insulation film formed by the process, on a surface including both at least one interior corner and at least one substantially planar surface, in the interior corner of the surface coated having the deepest recess (or in one of such corners if there are a plurality of such interior corners with equally deep recesses) has a thickness that is at least, with increasing preference in the order given, 75, 80, 85, 90, 95, or 100% of the thickness of the insulation in a direction perpendicular to a substantially planar part of the same coated surface coated in the same process.

The invention will be explained in greater detail below through working and comparative examples.

EXAMPLES

The following methods were used to evaluate the properties is reported below, unless otherwise stated below.

Coating Thickness

Figure 2:
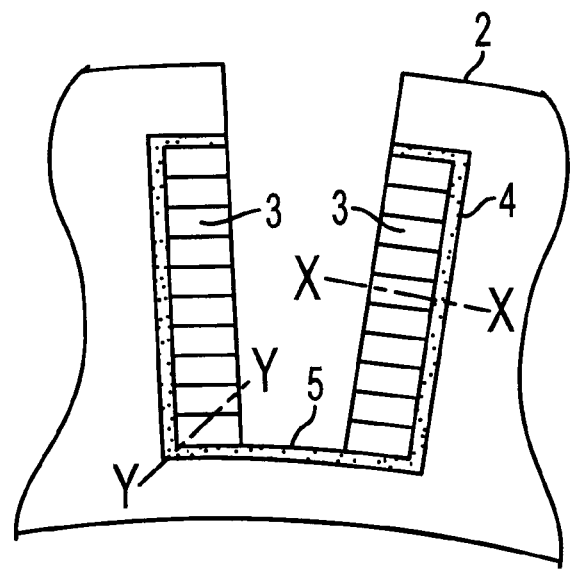
FIG. 2 is a sectional partial view, on a larger scale than FIG. 1, of the area between two of the projecting poles 1 in FIG. 1 and of the immediately surrounding parts of these projecting poles and of other materials which are part of a completed core and are at least partially situated between each pair of poles. (In a conventional completed core, the area between each pair of poles is substantially identical). Each projecting pole 1 is wound with windings 3. In the absence of insulation between the projecting poles 1 and windings 3, the windings would short circuit to each other through the core and the motor would not function.

A test motor core specimen as shown in FIG. 1 was cut across two of the projecting poles 1 at a position that was interior to distal ends 2 and accordingly intended to be covered by windings 3 as shown in FIG. 2 before the core is used in an actual motor. The insulation thickness was measured on part of an insulation-covered planar surface of the pole, as exemplified by dashed line X—X in FIG. 2, and in an interior corner where the same planar surface meets an interior arcuate surface as exemplified by dashed line Y—Y in FIG. 2.

Appearance

After coating, a test specimen was visually inspected in order to measure the number of defects, e.g., swelling of the coating, cracking, and poor hiding by the film. The result of this inspection is reported below on the following scale:

++: no defects (swelling, cracking, or poor hiding);

++: at least one but fewer than five defects;

x: 5 or more defects.

Insulation Performance Test

This test evaluated the practical quality of the insulation of the portion of the motor core over which the conductive windings are placed. The test specimen had 48 distinct areas for testing, one on each of the four sides of each projecting pole 1 as shown in either of the drawing figures. The coating at the center of a coated test specimen was peeled off, and the thus-bared center was connected to the negative pole of a test needle. The positive pole of the test needle was scanned over the winding region of the motor core in order to determine the number a of distinct areas along any portion of which current leakage occurred. The insulation performance was evaluated through the defect ratio=a/48 and/or by the percentage equivalent of this defect ratio=100a/48. The measurement instrument was an insulation resistance meter Model FI-901 from Nippon Technat Co., Ltd., using an applied voltage of 500 volts (hereinafter usually abbreviated as "V").

Measurement of the Volume Resistivity

1. Method: according to Japanese Industrial Standard K 6911.
2. Measurement instrument: Advantest™ R8340A Ultra High Resistance Meter with an Advantest™ R12704 Resistivity Chamber as electrode.
3. Measurement method and conditions: The test specimen was installed and the volume resistivity of the coating in ohm-cm was measured using the following procedures:
   i. 0 externally applied V during 30 seconds (hereinafter usually abbreviated as "sec") of discharging
   ii. 500 externally applied V during 60 sec of charging
   iii. 0 externally applied V during 30 sec of discharging.

Preparation of the Coating-forminc Resin Emulsion

A monomer mixture of 2 parts (denoting weight parts here and below) of methacrylic acid, 28 parts of methyl methacrylate, 30 parts of acrylonitrile, 20 parts of ethyl acrylate, and 20 parts of butyl acrylate was mixed with 1.0 part of acrylate ester-type reactive surfactant (i.e., 1.0 weight % based on the total weight of the above-listed five monomers), 0.3 part of ammonium persulfate, and 399.6 parts of water. Emulsion polymerization was then run for 4 hours at 75° C. by the usual method to yield resin emulsion with 20% of resin solids. The resin was cooled to 40° C., and its pH was adjusted with 25% aqueous ammonia to from 5 to 8 to give the coating-forming resin emulsion.

Constituents of Sample Autodepositing Waterborne Coating Composition (I)

| Component | Concentration in g/L |
|---|---|
| the above-described coating-forming resin emulsion | 280 |
| film-forming aid A | 4.00 |
| hydrofluoric acid | 0.70 |
| ferric fluoride | 3.00 |
| hydrogen peroxide | 0.10 |
| + deionized water to make a total of 1 L. | |

The film-forming aid A consisted of trialkylpentanediol isobutyrate molecules. Its addition gave a minimum film-forming temperature of about 20° C. for the composition.

Example 1

The test specimens were motor cores as shown in FIG. 1 that had been fabricated by laminating a plural number of magnetic steel sheets by pressing. These were subjected to a preliminary cleaning. The autodepositing waterborne coating composition prepared using the recipe given above was maintained at a bath temperature of 20° C. to 22° C., and the test specimens were coated by dipping for 60 seconds. This was followed by a water rinse, by dipping in deionized water for 60 seconds, and then drying for 20 minutes in a hot-air oven at 180° C. The test specimens were subjected to the various coating performance tests.

Example 2

While the autodepositing waterborne coating composition described for Example 1 was maintained at a bath temperature of 20° C. to 22° C., preliminarily cleaned test specimens as described for Example 1 were coated by dipping for 120 seconds. This was followed by a water rinse by dipping in deionized water for 60 seconds and then drying for 20 minutes in a hot-air oven at 180° C. The test specimens were subjected to the various coating performance tests.

Example 3

While the autodepositing waterborne coating composition described for Example 1 was maintained at a bath temperature of 20° C. to 22° C., preliminarily cleaned test specimens as described for Example 1 were coated by dipping for 180 seconds. This was followed by a water rinse by dipping in deionized water for 60 seconds and then drying for 20 minutes in a hot-air oven at 180° C. The test specimens were subjected to the various coating performance tests.

Example 4

While the autodepositing waterborne coating composition described for Example 1 was maintained at a bath temperature of 20° C. to 22° C., preliminarily cleaned test specimens as described for Example 1 were coated by dipping for 60 seconds. After a water rinse by dipping in deionized water for 60 seconds, the test specimens were dipped for 60 seconds in an aqueous solution that contained 4 g/L of hexavalent chromium. This was followed, without subjecting the coating to another water rinse, by drying for 20 minutes in a hot-air oven at 180° C. The test specimens were subjected to the various coating performance tests.

Example 5

While the autodepositing waterborne coating composition described for Example 1 was maintained at a bath temperature of 20° C. to 22° C., preliminarily cleaned test specimens as described for Example 1 were coated by dipping for 90 seconds. After a water rinse by dipping in deionized water for 60 seconds, the test specimens were dipped for 60 seconds in an aqueous solution that contained 4 g/L of hexavalent chromium. This was followed, without subjecting the coating to another water rinse, by drying for 20 minutes in a hot-air oven at 180° C. The test specimens were subjected to the various coating performance tests.

Example 6

While the autodepositing waterborne coating composition described for Example 1 was maintained at a bath temperature of 20° C. to 22° C., preliminarily cleaned test specimens as described for Example 1 were coated by dipping for 180 seconds. After a water rinse by dipping in deionized water for 60 seconds, the test specimens were dipped for 60 seconds in an aqueous solution that contained 4 g/L of hexavalent chromium. This was followed, without subjecting the coating to another water rinse, by drying for 20 minutes in a hot-air oven at 180° C. The test specimens were subjected to the various coating performance tests.

Comparative Example 1

The surfaces of preliminarily cleaned test specimens were coated with a primer (II) (main component=epoxy resin) to a thickness of about 20 micrometres on the planar regions of the core element on which windings are later to be placed. This was followed by drying for 20 minutes in a hot-air oven at 200° C. The test specimens were subjected to the various coating performance tests.

Comparative Example 2

The surfaces of preliminarily cleaned test specimens were coated with a primer (main component=epoxy resin) to a thickness of about 20 micrometres on the planar regions of the core element on which windings are later to be placed. This was followed by drying for 20 minutes in a hot-air oven at 200° C. The test specimens were removed from the oven and a ceramic paint, consisting of silicate-modified polyether resin, was coated on the primer to a thickness of about 40 micrometres. This was followed by drying for 20 minutes in a hot-air oven at 220° C. The test specimens were subjected to the various coating performance tests.

Example 7

The following test was run in order to compare the insulating properties of acrylic resin emulsions with those of vinylidene chloride resin emulsions.

The test specimens in each test were preliminarily cleaned cold-rolled rectangular steel sheet (Type SPCC, 70×100×0.8 mm). The test specimens were coated by dipping in autodepositing waterborne coating composition A or B maintained at a bath temperature of 20° C. to 22° C. The constituents for compositions A and B. except for water which constituted the balance of both compositions, are given in Table 1 below. After dipping, the test specimens were rinsed by dipping in deionized water for 60 seconds and then dried in a hot-air oven. The volume resistivity in ohm-cm was then measured.

TABLE 1

| Ingredient | Concentration of Ingredient, g/L, in Composition: | |
|---|---|---|
|  | A | B |
| Acrylic resin emulsion as in Example 1 | 280 | none |
| Poly{vinylidene chloride} resin emulsion | none | 140 |
| Film-Forming Aid A | 4 | none |
| Hydrofluoric Acid | 0.7 | 0.7 |
| Hydrogen Peroxide | 0.1 | 0.1 |
| Ferric Fluoride | 3 | 3 |

Results for Examples and Comparison Examples, except for Example 7, that did not include the use of a hexavalent chromium-containing rinse of the wet autodeposited coating are given in Table 2, results for Examples that did include the use of a hexavalent chromium-containing rinse of the wet autodeposited coating are given in Table 3, and results for Example 7 are given in Table 4.

TABLE 2

| Measurement Type and Units | Value of Measurement for: | | | | |
|---|---|---|---|---|---|
|  | Example Number: | | | Comp. Ex. #: | |
|  | 1 | 2 | 3 | 1 | 2 |
| Film thickness in micrometers: | | | | | |
| Along Line X-X: | 12 | 20 | 32 | 22 | 58 |
| Along Line Y-Y: | 15 | 25 | 36 | 6 | 22 |
| Appearance Rating: | + + | + + | + | x | + + |
| Insulation Defect Percentage: | 8 | 0 | 0 | 75 | 8 |

Abbreviation in Table 2
"Comp. Ex. #" means "Comparative Example Number.

TABLE 3

| Measurement Type and Units | Value of Measurement for: Example Number: | | |
|---|---|---|---|
|  | 4 | 5 | 6 |
| Chromium Add-on, mg/m² | 500 | 450 | 520 |
| Film thickness in micrometers: | | | |
| Along Line X-X: | 12 | 21 | 33 |
| Along Line Y-Y: | 14 | 25 | 37 |
| Appearance Rating: | + + | + + | + + |
| Insulation Defect Percentage: | 0 | 0 | 0 |

Abbreviation in Table 3
"mg/m²" means "milligrams of stoichiometric equivalent as chromium metal added-on per square meter of surface coated."

TABLE 4

| Film Thickness in Micrometers | Volume Resistivity Value for Film Formed from: | |
|---|---|---|
|  | Composition A | Composition B |
| 15 | $1.653 \times 10^{16}$ ohm centimeters | $3.060 \times 10^{15}$ ohm centimeters |
| 20 | $3.002 \times 10^{16}$ ohm centimeters | $3.143 \times 10^{15}$ ohm centimeters |
| 25 | $4.797 \times 10^{16}$ ohm centimeters | $3.794 \times 10^{15}$ ohm centimeters |

The following conclusions can be drawn based on Examples 1 to 7 and Comparative Examples 1 and 2:

(1) Examples 1 to 3, which employed a coating method according to the present invention, provided a safe coating thickness in the corner despite a relatively small coating thickness overall, and thus provided excellent insulating properties even at small coating thicknesses.

(2) In contrast to the preceding, a poor insulation performance was obtained in Comparative Example 1, in which coating was executed by a conventional method. This required that the coating thickness be increased as in Comparative Example 2 in order to obtain a satisfactory insulation performance.

(3) As demonstrated in Examples 4 to 6, the addition of chromium to the resin film according to the present invention can improve film appearance for thick films and secure satisfactory insulating properties even for thin films.

(4) As demonstrated by the results reported in Table 3 for the comparison in Example 7 of the insulating properties of an acrylic resin emulsion with those of a vinylidene chloride resin using the coating method according to the present invention, at a withstand voltage of 500 V the acrylic type gave the better volume resistivity of 1.6 to $4.8 \times 10^{16}$ ohm-cm, against the 3.0 to $4.0 \times 10^{15}$ ohm-cm given by the vinylidene chloride type.

BENEFITS OF THE INVENTION

A method according to the present invention for coating the surface of laminated motor cores provides an insulating layer with excellent insulating properties and at the same time provides a shorter treatment operation than the prior insulating treatment operations. Moreover, the invention method can provide a sufficiently thick coating in the corners without having to raise the thickness of the insulating layer on other parts of the coated substrate. As a result, the thickness of the insulating layer on the surface of the coated substrate as a whole can be reduced while at the same time an insulating film is obtained that has excellent insulating properties.

These effects satisfy the requirements imposed by reductions in motor size and thickness.

What is claimed is:

1. A method for forming an electrically insulating film on a motor core surface comprising the steps of: depositing an uncured resin film on electrically conductive projecting poles and interior corners of a motor core by contacting said motor core with an autodepositing waterborne coating composition under autodeposition conditions sufficient to form an uncured resin film; and drying said uncured resin film by heating to form an electrically insulating resin film on said poles.

2. A method according to claim 1, wherein said coating-forming resin is a polymer or copolymer of at least one monomer selected from the group consisting of acrylic and methacrylic acids, esters of acrylic and methacrylic acids with alcohols having from 1 to 4 carbon atoms per alcohol molecule, and nitrites and amides of acrylic and methacrylic acids.

3. A motor core having an insulating film formed by the method of claim 2 on a plurality of projecting poles of said motor core.

4. A method according to claim 1 wherein said autodepositing waterborne coating composition comprises an emulsion of coating-forming resin, acid, oxidizing agent, metal ions and water.

* * * * *

UNITED STATES PATENT AND TRADEMARK OFFICE
CERTIFICATE OF CORRECTION

PATENT NO. : 6,211,283 B1
DATED : April 3, 2001
INVENTOR(S) : Honda et al.

It is certified that error appears in the above-identified patent and that said Letters Patent is hereby corrected as shown below:

Title page,
Item [57], ABSTRACT,
Line 3, delete "comer"; and insert therefor -- corner --.

Signed and Sealed this

Twenty-seventh Day of August, 2002

*Attest:*

*Attesting Officer*

JAMES E. ROGAN
*Director of the United States Patent and Trademark Office*